United States Patent Office 2,823,238
Patented Feb. 11, 1958

2,823,238

PROCESS OF PREPARING 2-PHENYLETHANOL-1

Muus Gerrit Jan Beets, Hilversum, Netherlands, and Emanuel Alexander Drukker, Milwaukee, Wis., assignors to N. V. Polak & Schwarz's Essencefabrieken, Hilversum, Netherlands, a corporation of the Netherlands No Drawing. Application March 23, 1954
Serial No. 418,217

Claims priority, application Netherlands
December 14, 1950

6 Claims. (Cl. 260—618)

The present invention relates to a novel and improved process of preparing 2-phenylethanol-1.

This is a continuation-in-part of our application Serial No. 259,881, filed December 4, 1951, and now abandoned.

Phenylethyl alcohol (2-phenylethanol-1) may be considered one of the most important raw materials in the perfume industry.

Numerous methods of preparing this compound have been described in the literature.

Esters of phenyl acetic acid can be reduced to phenylethyl alcohol with sodium and alcohol, according to L. Bouveault and C. Blanc, Compt. Rend. 137, 60 (1903), or, according to U. S. Patent No. 2,091,800, with the aid of copper chromium oxide catalysts.

Condensation of benzene with ethylene oxide under the action of aluminum chloride also leads to the formation of phenylethyl alcohol (U. S. Patents Nos. 1,944,959 and 2,013,710) just as the condensation of alkaliphenyl (German Patent No. 596,523) or phenylmagnesium-bromide (U. S. Patent No. 1,996,746; German Patents Nos. 660,075 and 697,420) with ethylene oxide or ethylenechlorohydrin.

β-Phenylethyl alcohol can also be prepared by chlorination of ethylbenzene followed by selective hydrolysis, according to U. S. Patent No. 2,185,141, or by hydrogenation of phenylacetaldehyde (Ber. 56, 2176 (1923)).

These methods of preparation, however, all have certain disadvantages. Some start from complex raw materials or require the use of expensive auxiliary substances or reaction conditions, such as reduction of esters with sodium and alcohol, reduction of phenylacetaldehyde (method of Grignard); others proceed in a large dilution or give impure final products which render a particular purification process necessary (reaction of Friedel-Crafts).

In this respect, U. S. Patent No. 2,524,096, according to which the catalytic reduction of styrene oxide gives a good yield of β-phenylethyl alcohol, constitutes an improvement over the prior art.

We have now found that it is not necessary to start from styrene oxide, a raw material which is prepared in a very inefficient manner from styrene with the aid of peroxides or from 1-phenyl 2-halogenethanol-1, but that 1-phenyl-2-halogen-ethanol-1 can be catalytically reduced directly to β-phenylethyl alcohol, provided that the reduction is carried out in the presence of a compound able to combine hydrogen halide acid. Preferably strong alkalis are used for this purpose. The reaction is effected under the influence of a low temperature hydrogenation catalyst. Raney nickel, palladium oxide and platinum on carbon have been found to be effective for this purpose.

With this method, styrene oxide is first formed from styrene halogenhydrin in the aggregate in which the reaction takes place, whereupon immediate reduction to β-phenylethanol follows.

It is surprising that this reaction gives an excellent yield, which is higher than the yield obtained when working via purified styrene oxide, while proceeding without the formation of undesirable by-products, considering that two competing reactions are possible under these circumstances, to wit:

(1) 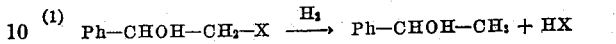
Ph—CHOH—CH$_2$—X $\xrightarrow{H_2}$ Ph—CHOH—CH$_3$ + HX (2) 
Ph—CHOH—CH$_2$—X ⟶

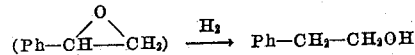
(Ph—CH—─CH$_2$) $\xrightarrow{H_2}$ Ph—CH$_2$—CH$_2$OH
       \\O/ in which Ph represents phenyl and X halogen.

It is remarkable that Reaction 1 does not occur at all here since the halogen atom can be considered as one of the groups which is most easily hydrogenolized.

The above-described process has considerable technical advantages. Since styrene oxide, as already mentioned, can be efficiently prepared only from styrene halogenhydrin, it is an advantage that, according to the present invention, this conversion is not necessary as a separate treatment.

A considerable advantage is also that the halogenhydrin can be treated in an entirely crude form because styrene halogenhydrin can be most simply prepared in aqueous medium. Dihalostyrene is generally obtained as a by-product or impurity. The mixture of the reaction products has a high density and immediately separates as an oil from the reaction medium after completion of the treatment, whereupon it can be separated easily from the aqueous upper layer.

According to the present invention, this crude reaction product need not be purified in any way since the by-product present is converted under our reaction conditions into the volatile ethylbenzene which, consequently, can be easily removed by fractional distillation. Conversion of the crude styrene halogenhydrin-containing reaction mixture into β-phenylethyl alcohol is now possible without any loss of yield or reduction of the quality of the final product.

This final product only needs to be purified by a simple distillation to be obtained in a completely pure form.

Neither the odor nor the chemical purity of the β-phenyl-ethanol obtained from either purified or crude styrene halogen-hydrin differ from the product prepared from pure styrene oxide.

Styrene halogenhydrins may be prepared, e. g. according to A. Detoeuf (Bull. (4) 31 (1922), 169) by reacting styrene with an aqueous solution of chlorourea or, according to U. S. Patent No. 2,237,284, by reacting styrene with halogen and water.

The following examples are given to illustrate the invention which, however, is not limited to these specific embodiments.

*Example I*

91 g. (0.58 mol) of styrene chlorohydrin, 78 g. (0.64 mol) of 33% caustic soda, and 50 g. of water, together with a small quantity of Raney-nickel, were introduced in a stainless steel shaking autoclave. The hydrogenation was carried out at room temperature and a maximal hydrogen pressure of 25 atmospheres. The catalyst was removed, and the oil layer separated and distilled after washing in vacuo.

Yield: 58 g. of β-phenylethyl alcohol or 81.5% of theoretical. Boiling point: 84°/4 mm. $n_D^{20}$ 1.5320.

*Example II*

402 g. (2 mols) of styrenebromohydrin, 267 g. (2.2 mols) of 33% caustic soda and 500 cm.³ of water were reacted in an autoclave together with a small quantity of Raney-nickel. The hydrogenation was carried out at room temperature and a pressure of 25 atmospheres. After 3 hours the hydrogen absorption ended. The catalyst was removed, and the oil layer separated and fractionated after washing in vacuo.

Yield: 212 g. of β-phenylethyl alcohol or 87% of theoretical. Boiling point 84°/4 mm. $n_D^{20}$ 1.5320.

*Example III*

100.5 g. (0.5 mol) of styrenebromohydrin and 230 g. of a 40% aqueous solution of trimethylbenzylammoniumhydroxide were brought into an autoclave together with a small quantity of Raney-nickel. The hydrogenation was carried out at room temperature and a maximum pressure of 25 atmospheres and was completed in approximately 3 hours. The yield amounted to 33 g. of β-phenylethanol or 54% of theoretical.

*Example IV*

940 g. of a crude mixture mainly consisting of styrenebromohydrin and approximately 24% of dibromostyrene, and 625 g. of 33% caustic soda were brought into an autoclave together with a small quantity of Raney-nickel. The reduction proceeded as in Example III and yielded 368 g. of β-phenylethyl alcohol. $n_D^{20}$ 1.5323. Soluble in 12.2 volumes of 30% ethanol.

*Example V*

402 g. of styrenebromohydrin, 430 g. of bariumhydroxide hydrate, 300 cm.³ of water and a small quantity of Raney-nickel were brought into an autoclave. The reaction proceeded as in Example III and resulted in a yield of 180.5 g. of β-phenylethanol or 74% of theoretical. $n_D^{20}$ 1.5330. Boiling point 82°/3 mm.

*Example VI*

101 g. (0.5 mol) of styrene bromohydrin and a solution of 24 g. (0.6 mol) of sodium hydroxide in 150 g. of water were brought into an autoclave with 1 g. of palladium oxide. The hydrogenation was carried out at room temperature and a pressure of 25 atmospheres. The catalyst was removed, and the oil layer separated and washed. The reaction product was fractionated in vacuo.

Yield: 43 g. of phenylethyl alcohol or 70.5% of theoretical. $n_D^{20}$ 1.5330. Boiling point at 5 mm. 89-92°.

*Example VII*

101 g. (0.5 mol) of styrene bromohydrin, a solution of 24 g. (0.6 mol) sodium hydroxide in 150 g. of water and 17.5 g. of a platinum on carbon catalyst (5-6%) were brought into an autoclave. The hydrogenation was carried out at room temperature and at a pressure of 25 atmospheres. After completion of the hydrogenation, the reaction product was worked up as described in Example VI and fractionated in vacuo.

Yield: 42 g. of phenylethylalcohol or 69% of theoretical. $n_D^{20}$ 1.5328-1.5334.

What we claim is:

1. The process of preparing 2-phenylethanol-1, comprising treating styrene halogenhydrin, the halogen being selected from the group consisting of chlorine and bromine, at a hydrogen pressure sufficient to maintain hydrogen in the liquid phase with hydrogen under the influence of a catalyst selected from the group consisting of Raney nickel, palladium oxide and platinum on carbon, and in the presence of an aqueous strongly alkaline reacting substance in an amount at least stoichiometrically equivalent to the halogen, without external heating.

2. The process as defined in claim 1, wherein the catalyst is Raney nickel.

3. The process of preparing 2-phenylethanol-1, comprising treating crude styrene halogenhydrin, the halogen being selected from the group consisting of chlorine and bromine, at a hydrogen pressure sufficient to maintain hydrogen in the liquid phase with hydrogen under the influence of a catalyst selected from the group consisting of Raney nickel, palladium oxide and platinum on carbon, and in the presence of an aqueous strongly alkaline reacting substance in an amount at least stoichiometrically equivalent to the halogen, without external heating.

4. The process as defined in claim 3, wherein the catalyst is Raney nickel.

5. The process of preparing 2-phenylethanol-1, comprising treating styrene halogenhydrin containing dihalogenstyrene as an impurity, the halogen being selected from the group consisting of chlorine and bromine, at a hydrogen pressure sufficient to maintain hydrogen in the liquid phase with hydrogen under the influence of a catalyst selected from the group consisting of Raney nickel, palladium oxide and platinum on carbon, and in the presence of an aqueous, strongly alkaline reacting substance in an amount at least stoichiometrically equivalent to the halogen, without external heating.

6. The process as defined in claim 5, wherein the catalyst is Raney nickel.

References Cited in the file of this patent

UNITED STATES PATENTS 2,582,114    Frisch _____ Jan. 8, 1952

FOREIGN PATENTS 507,501    Belgium _____ Dec. 15, 1951
699,062    Great Britain _____ Oct. 28, 1953

OTHER REFERENCES

Newman et al.: Chem. Abst., vol. 44 (1950), column 2911 (1 p.).